United States Patent
Sanseverino

(10) Patent No.: US 9,538,776 B2
(45) Date of Patent: Jan. 10, 2017

(54) PRESSURIZED OVEN ASSEMBLY

(71) Applicant: KitchenTek LLC, Hollywood, FL (US)

(72) Inventor: Michael Gary Sanseverino, Parkland, FL (US)

(73) Assignee: KitchenTek, LLC, Hollywood, FL (US)

(*) Notice: Subject to any disclaimer, the term of this patent is extended or adjusted under 35 U.S.C. 154(b) by 242 days.

(21) Appl. No.: 13/913,112

(22) Filed: Jun. 7, 2013

(65) Prior Publication Data

US 2014/0322416 A1 Oct. 30, 2014

(30) Foreign Application Priority Data

Apr. 27, 2013 (CN) .......................... 2013 1 0152192
Apr. 27, 2013 (CN) .......................... 2013 2 0222654

(Continued)

(51) Int. Cl.
*A47J 27/00* (2006.01)
*A23L 1/01* (2006.01)
(Continued)

(52) U.S. Cl.
CPC .............. *A23L 1/0135* (2013.01); *A23L 5/17* (2016.08); *A47J 27/0804* (2013.01);
(Continued)

(58) Field of Classification Search
CPC ...... A47J 27/0817; A47J 27/092; A47J 27/08; F24C 7/04
(Continued)

(56) References Cited

U.S. PATENT DOCUMENTS 2,634,749 A 4/1953 Cone
3,078,499 A 2/1963 Gray et al.
(Continued)

FOREIGN PATENT DOCUMENTS

EP 2988599 A1 3/2016
WO 2014/176592 A1 10/2014

OTHER PUBLICATIONS

International Search Report, dated Aug. 22, 2014, issued in corresponding International Patent Application No. PCT/US2014/035679.
(Continued)

*Primary Examiner* — Reginald L Alexander
(74) *Attorney, Agent, or Firm* — Eric L. Sophir; Dentons US LLP

(57) ABSTRACT

A pressurized oven is provided having a fully sealed cavity, reduces heat lost, shortens cooking time and saves energy of oven operation. The pressurized oven includes a cavity component, a door assembly, heating elements and a control system that includes a relief valve on top of the cavity. The relief valve includes a valve weight and a venting stub, wherein the valve weight sits on the top of the venting stub. The valve weight disposed on top of the venting stub remains closed and the gas is not released when the pressure is not sufficient to lift the valve weight. When the pressure inside the oven is sufficient to lift the valve weight, the valve weight block is lifted to open the valve, the gas is released and the pressure is decreased. Once the pressure becomes less than the valve weight, the valve closes and gas is no longer released.

15 Claims, 17 Drawing Sheets

(30) Foreign Application Priority Data

| Apr. 27, 2013 | (CN) | 2013 2 0223131 |
|---|---|---|
| Apr. 27, 2013 | (CN) | 2013 2 0223132 |
| Apr. 27, 2013 | (CN) | 2013 2 0223133 |
| Apr. 27, 2013 | (CN) | 2013 2 0223134 |
| Apr. 27, 2013 | (CN) | 2013 2 0223135 |
| Apr. 27, 2013 | (CN) | 2013 2 0223136 |
| Apr. 27, 2013 | (CN) | 2013 3 0145894 |

(51) Int. Cl.
 *F24C 7/04* (2006.01)
 *A47J 27/092* (2006.01)
 *A47J 27/08* (2006.01)
 *A47J 27/086* (2006.01)
 *A47J 37/06* (2006.01)

(52) U.S. Cl.
 CPC ......... *A47J 27/086* (2013.01); *A47J 27/0817* (2013.01); *A47J 27/092* (2013.01); *F24C 7/04* (2013.01); *A23L 5/15* (2016.08); *A23V 2002/00* (2013.01); *A47J 37/0629* (2013.01)

(58) Field of Classification Search
 USPC ... 99/337, 467, 468, 473; 219/395, 401, 440
 See application file for complete search history.

(56) References Cited

U.S. PATENT DOCUMENTS

| 3,428,783 A | 2/1969 | Niles |
| 3,596,651 A | 8/1971 | Welshofer et al. |
| 4,039,776 A | 8/1977 | Roderick |
| 4,103,671 A | 8/1978 | Smith |
| 4,133,337 A | 1/1979 | Shea |
| 4,154,861 A | 5/1979 | Smith |
| 4,246,955 A * | 1/1981 | Skala ............................ 165/234 |
| 4,348,835 A | 9/1982 | Jones et al. |
| 4,410,030 A | 10/1983 | Skala |
| 4,430,557 A | 2/1984 | Eichelberger et al. |
| 4,441,015 A * | 4/1984 | Eichelberger et al. ....... 219/411 |
| 4,455,924 A | 6/1984 | Wenzel |
| 4,512,331 A | 4/1985 | Levi |
| 4,558,196 A | 12/1985 | Babasade |
| 4,593,945 A | 6/1986 | Arute et al. |
| 4,623,780 A | 11/1986 | Shelton |
| 4,660,250 A | 4/1987 | Tillman et al. |
| 4,798,939 A | 1/1989 | Nett |
| 4,813,398 A | 3/1989 | Savage |
| 4,839,502 A | 6/1989 | Swanson et al. |
| 4,947,036 A | 8/1990 | Pokorski et al. |
| 4,995,313 A | 2/1991 | Delau et al. |
| 5,168,797 A | 12/1992 | Wang |
| 5,205,273 A | 4/1993 | Sparks et al. |
| 5,215,000 A | 6/1993 | Desage et al. |
| 5,229,563 A * | 7/1993 | Isogai et al. .................. 219/735 |
| 5,417,148 A | 5/1995 | Cavallo |
| 5,592,780 A | 1/1997 | Checkovich |
| 5,639,497 A | 6/1997 | Bedford et al. |
| 5,710,409 A | 1/1998 | Schwarzbacker et al. |
| 5,747,782 A | 5/1998 | Orrico et al. |
| 5,767,487 A | 6/1998 | Tippmann |
| 5,887,916 A | 3/1999 | Finkelstein et al. |
| 5,900,801 A | 5/1999 | Heagle et al. |
| 5,939,974 A | 8/1999 | Heagle et al. |
| 5,978,863 A | 11/1999 | Gates et al. |
| 5,988,842 A | 11/1999 | Johnsen et al. |
| 6,012,444 A * | 1/2000 | Skender ...................... 126/41 R |
| 6,095,851 A | 8/2000 | Laity et al. |
| 6,310,325 B1 | 10/2001 | Colburn |
| 6,316,749 B1 | 11/2001 | Bales et al. |
| 6,445,287 B1 | 9/2002 | Schofield et al. |
| 6,537,065 B1 | 3/2003 | Shirali et al. |
| 6,679,246 B2 | 1/2004 | Strolz et al. |
| 6,727,814 B2 | 4/2004 | Saltzstein et al. |
| 6,736,631 B2 | 5/2004 | Ferlin et al. |
| 6,747,874 B2 | 6/2004 | McKinnon et al. |
| 6,756,911 B2 | 6/2004 | Striano et al. |
| D499,604 S | 12/2004 | Hooper et al. |
| RE38,686 E | 1/2005 | Loblick |
| 6,867,704 B2 | 3/2005 | Pellegrino |
| 6,935,223 B2 | 8/2005 | Kobayashi |
| 7,000,530 B2 | 2/2006 | Damrath et al. |
| 7,002,453 B2 | 2/2006 | Martinez |
| 7,049,976 B2 | 5/2006 | Hunt et al. |
| 7,194,183 B2 | 3/2007 | Thornton et al. |
| 7,208,701 B2 | 4/2007 | Fraccon et al. |
| 7,619,188 B2 | 11/2009 | Oghafua et al. |
| 7,971,393 B2 | 7/2011 | Gao et al. |
| 8,327,756 B1 | 12/2012 | Hoffman et al. |
| 2004/0008920 A1 | 1/2004 | Endicott |
| 2004/0168284 A1 | 9/2004 | Duffy |
| 2004/0173324 A1 | 9/2004 | Butler |
| 2005/0034716 A1 | 2/2005 | Harbin |
| 2005/0039613 A1 | 2/2005 | Kaminaka et al. |
| 2005/0155179 A1 | 7/2005 | Duffy |
| 2005/0193901 A1 | 9/2005 | Buehler |
| 2005/0217503 A1 | 10/2005 | McFadden |
| 2006/0011607 A1 | 1/2006 | Cho et al. |
| 2006/0032573 A1 | 2/2006 | Gilkerson et al. |
| 2006/0113294 A1 | 6/2006 | LoMaglio et al. |
| 2006/0254893 A1 | 11/2006 | Mills et al. |
| 2006/0289441 A1 | 12/2006 | Bartelick |
| 2007/0039488 A1 | 2/2007 | Hunter et al. |
| 2007/0059975 A1 | 3/2007 | Walsh |
| 2007/0068918 A1 | 3/2007 | Adamczak et al. |
| 2007/0074591 A1 | 4/2007 | Santos et al. |
| 2007/0240701 A9 | 10/2007 | Schnell et al. |
| 2008/0092754 A1 | 4/2008 | Noman |
| 2010/0089904 A1 | 4/2010 | Yun |
| 2010/0310733 A1 * | 12/2010 | Hoffman ....................... 426/233 |
| 2011/0024412 A1 | 2/2011 | Su et al. |
| 2012/0037617 A1 | 2/2012 | Kim |
| 2012/0199571 A1 * | 8/2012 | Brown ........................ 219/401 |
| 2014/0322416 A1 | 10/2014 | Sanseverino |

OTHER PUBLICATIONS

The Lee Company. 375 PRI®/CHEK® Valv, Product Data Sheet, The Lee Company, Westbrook, CT, pp. 1-2, Feb. 2012. Retrieved from the internet: <URL: http://www.theleeco.com/whats-new/pdf/(2012-02)-PDS-117-375-PRI-CHEK.pdf>.

International Preliminary Report on Patentability dated Jun. 10, 2010 in PCT/US2008/013096.

Notification of Transmittal of International Search Report and Written Opinion dated Jan. 14, 2009 in PCT/US2008/013096.

Canadian Examination Report dated Oct. 4, 2016 in Canadian Application 2,910,574, 3 pages.

* cited by examiner

PRESSURIZED OVEN ASSEMBLY

RELATED APPLICATIONS

This application claims priority from Chinese Patent Application Nos. 201310152192.3, 201320223136.X, 201320223135.5, 201320223134.0, 201320222654.X, 201320223133.6, 201320223132.1, 201320223131.7, and 201330145894.X, each of which was filed on Apr. 27, 2013, and entitled "Oven." This application is also related to U.S. patent application Ser. No. 12/734,737, filed on Nov. 25, 2008, and entitled "Pressurized Cooking Oven." The entirety of each of the preceding applications is incorporated by reference herein.

BACKGROUND OF THE INVENTION

1. Field of Invention

Aspects of the present invention relate to methods and systems for food preparation. More particularly, aspects of the current invention related to methods and systems for pressurized cooking.

2. Background

Food preparation generally involves raising the internal temperature of the food to a specified level. There are a variety of conventional methods for food preparation, such as on top of a flame (e.g., grilling, pan frying, boiling) and in an oven (e.g., baking, broiling). In all methods, the same concept of raising the temperature of the product is the ultimate goal. The manner in which that goal is accomplished affects the taste and the time involved in the cooking process. In a conventional oven, the heat migrates (by conduction) from the outside of the food toward the middle. There may also be dry, hot air on the outside of the food evaporating moisture on the surface of the food product. As a result, the surface of the food product dries out, becoming crispy and brown, while the inside of the food product remains moist.

In recent years, microwave ovens have become commonplace in the household. A microwave oven uses microwaves to heat food. In the case of microwave ovens, the commonly used radio wave (micro wave) frequency is roughly 2,500 megahertz (2.5 gigahertz). Radio waves in this frequency range can be absorbed by water, fats and sugars, and when are absorbed, the radio waves are converted directly into atomic motion, and thus into heat. Microwaves in this frequency range are also not absorbed by most plastics, glasses or ceramics. In microwave cooking, the radio waves penetrate the food product and excite water and fat molecules throughout the food product more evenly than in a conventional over. No heat conduction toward the interior occurs. However, there are drawbacks to microwave cooking, in that the radio waves penetrate unevenly in thick pieces of food and, as such, do not always reach the middle of the food product, and "hot spots" can be caused by wave interference inside the food product.

A method of cooking on a stove top involves the use of a pressure cooker, which is a pot for food preparation that is designed to maintain a pressure above atmospheric pressure. Water in an open pot boils at 100° C. at a standard atmosphere. As the water evaporates and becomes steam, the water remains at the same temperature. The only way to make the steam hotter (and/or to boil the water at a higher temperature) is to increase the pressure, which can be accomplished by a pressure cooker. The heat from the stovetop transfers through the metal pot to the contents (which generally include water and the items being cooked.) Since the pressure cooker is sealed, as the water inside the container expands to steam, the closed environment of the container causes the pressure inside the container to rise. The higher pressure, in turn, results in a higher temperature inside the vessel. For example, at higher pressures, the temperature at which water boils is higher than 100° C. The increased pressure inside the pot delays the water and/or other liquids inside the pot from boiling until the liquid reaches a much higher temperature. As a result, the cooking process is sped up considerably.

However, currently, cooking using an oven is performed at atmospheric pressure and generally takes a long time. As such, there is a need in the art for an improved oven for food preparation products that involves pressurized cooking in an oven.

SUMMARY OF THE INVENTION

In light of the above described problems and unmet needs, aspects of the current invention provide systems and methods of providing a pressurized oven for cooking purposes. According to various aspects of the current invention, a pressurized oven is provided that has a fully sealed cavity, reduces heat lost, shortens food cooking time and saves energy of oven operation. The pressurized over may include a cavity component, a door assembly, heating elements and a control system. The door assembly, heater and control system attached to the cavity component with sealing at junction to be a closed vessel, the cavity component formed by seamless junction.

Aspects of various aspects of the current invention include sealing the oven cooking chamber with full range of sealing and thus reducing heat loss to the greatest extent possible in order to achieve rapid cooking and energy savings. At the same time, the pressure of gas in the oven may be higher than atmospheric pressure because of expansion due to the heat, the boiling point temperature of any food product in water inside the pressure cooker is thus increased, so the cooking temperature inside the pressure cooker is raised accordingly, and the overall cooking time is greatly reduced. According to various aspects, a feedback loop with a pressure monitor to control the pressure inside the pressurized oven may be added, wherein if the pressure inside the cavity of the pressurized oven reaches a certain limit, then the oven is turned off in order to prevent accidental explosions.

Additional advantages and novel features of these aspects of the invention will be set forth in part in the description that follows, and in part will become more apparent to those skilled in the art upon examination of the following or upon learning by practice of the invention.

BRIEF DESCRIPTION OF THE DRAWINGS

Various example aspects of the systems and methods will be described in detail, with reference to the following figures, wherein.

DETAILED DESCRIPTION

Figure 1:
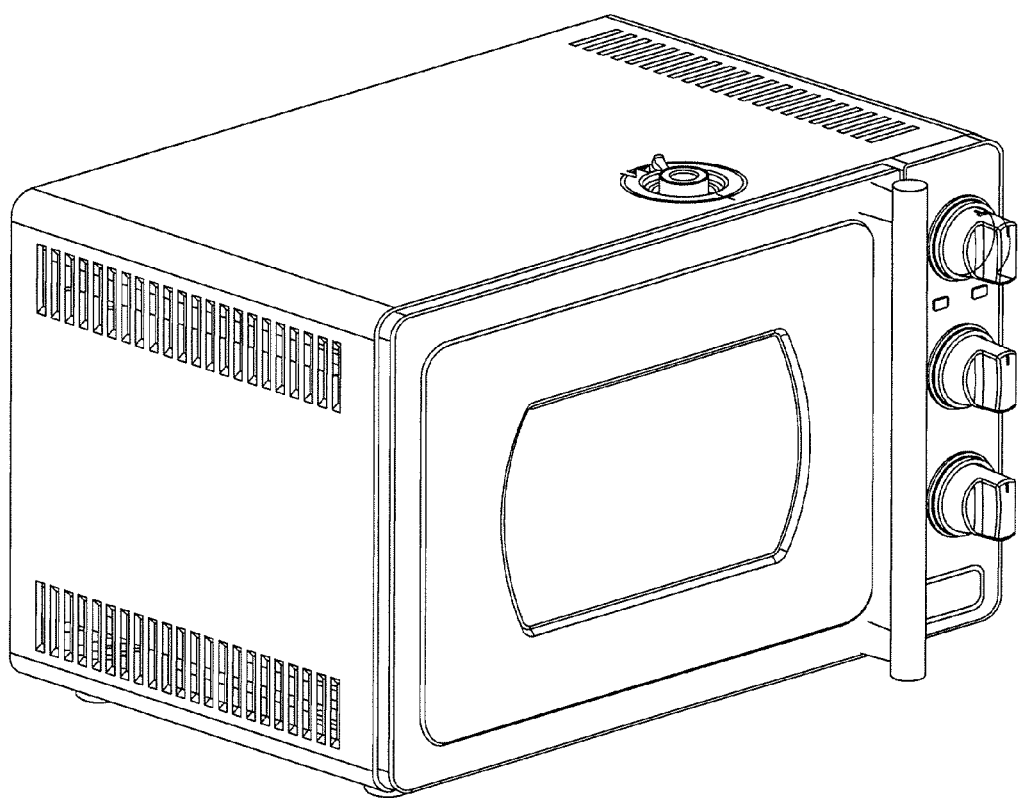
FIG. 1 is a diagram illustrating an isometric view of a pressurized oven according to various aspects of the invention.

These and other features and advantages of this invention are described in, or are apparent from, the following detailed description of various example aspects.

According to various aspects of the current invention, the cavity component of the pressurized oven may include cavity side walls, a front frame and a rear plate, wherein the cavity side walls, the front frame and the rear plate are formed as one part, or are welded to be one component, instead of being assembled by screws or glue, which provides better sealing performance and more stability for long time using of the oven. The door assembly may include a door frame, having hinges, a latch and a first sealing gasket, the hinges permitting a rotation of the door rotation, and the other side of the door frame is attached to a door latch to lock or unlock. Accordingly, when the door is locked, the door frame seals with the front frame through the sealing gasket. Aspects of the present invention allow a maximum temperature of about 230° C., so first sealing gasket must be designed to have enough elasticity at high temperatures to seal the oven for a long time.

According to various aspects of the current invention, the door assembly may include a locking mechanism consisting of transmission parts and a lever, wherein when the door is closed, the lever drives the transmission parts to engage the door latch and draw the door frame to be tightly fitted with the front frame via the connection of the latch and the front frame. The locking mechanism uses the lever principle, whereby moving the handle bar up and down to drive the linkage and transmission parts in a back and forth direction locks and releases the door frame. When the door is closed, the handle lever is moved in a downward position and the transmission parts are driven to move backward, and the door frame is pulled to fit tightly with and seal the front frame of the cavity further. Opening the door is the reverse process.

According to various aspects, the control system may include a relief valve on the cavity top, the relief valve including a valve weight with a handle, a venting stub and a silicon sealing gasket, wherein the valve weight sits on the top of the venting stub, the relief valve connecting the cavity with the silicon gasket for sealing. The pressure of the gas inside the cavity is gradually increased with cooking time in order to prevent accidental explosions due to high pressure. As such, the relief valve is used to relieve pressure. According to various aspects, a valve weight is disposed on top of the exhaust stub so that when the pressure is less than the weight of the valve, the valve remains closed and the gas is not released and the oven is sealed. However, when the pressure inside the oven is higher than the weight of the valve, the valve weight block is lifted, the gas is released and the pressure is decreased. Once the pressure becomes less than the weight of the valve block, the gas is no longer released and the oven is back to being sealed. According to various aspects, an inside diameter of the venting stub is 5 to 8 mm, the weight of the valve is 22 to 24 g, and the pressure in the oven is maintained to be about 6.8 to 10 Kpa.

According to various aspects, a rotisserie assembly may include a motor, a bracket, a connection shaft, rotisserie kits, sleeves and nuts, wherein the motor is mounted inside the cavity through a bracket, one side of the connection shaft connects to the motor and another side connects to the rotisserie. The sleeve contained in the connection shaft is mounted in the cavity by a nut, the connection shaft is covered by a sealing gasket inside of the sleeve, another sealing gasket is set between the sleeve and the nut, the sealing between rotisserie assembly and the cavity component being achieved via the sealing gaskets. The food product may be disposed on the rotisserie forks during cooking and the rotation speed of the rotisserie may be about 2 to 3 about rotations per minute (rpm) in order to obtain an even and high quality cooking performance. According to various aspects, the heater may include at least one heating element assembly, the element assembly consists of heating elements, a fastener and a sealing gasket, the heating element being mounted inside the cavity by fastener and seals via the sealing gasket. According to various aspects, the heater may include a plurality of heating elements as top, bottom and rear heating elements. Accordingly, the multiple heating elements may help increase the cooking temperature and greatly shorten cooking time. In other application case, the heating numbers could depend on the particular facts.

According to various aspects, the control system may include a temperature controller, a temperature selection switch, a function switch, a timer and a door release button, wherein the temperature selection switch, function switch, timer and door release button may be located on a front control panel, and the temperature controller being mounted on a rear plate. The temperature controller and selection switch may be used to control the cooking temperature of the cavity, wherein the power may be turned off when the temperature of the cavity is too high, and be turned on when temperature is lower than required. The function switch may control various combinations of the heating elements, such as top heating element, bottom heating element, top heating element plus bottom heating element, and top heating element plus rear heating element, among other combinations. The timer may be used to control the cooking time, where the unit may be turned off when a given time has elapsed. The door release button may be used to release the door after cooking and to completely relieve the pressure from the cavity.

Various advantages of aspects of the current invention include rapid cooking and energy-saving via a fully sealed chamber to further reduce heat loss. Meanwhile, the pressure of gas in the oven is higher than atmospheric pressure due to expansion of steam when heated, and the boiling temperature of water is increased, so that the cooking temperature of the food products inside the pressurized over is raised accordingly. As such, cooking time is greatly reduced. According to various aspects, a feedback loop with a pressure monitor to control the pressure inside the pressurized oven may be added, wherein if the pressure inside the cavity of the pressurized oven reaches a certain limit, then the oven is turned off in order to prevent accidental explosions.

Figure 2:
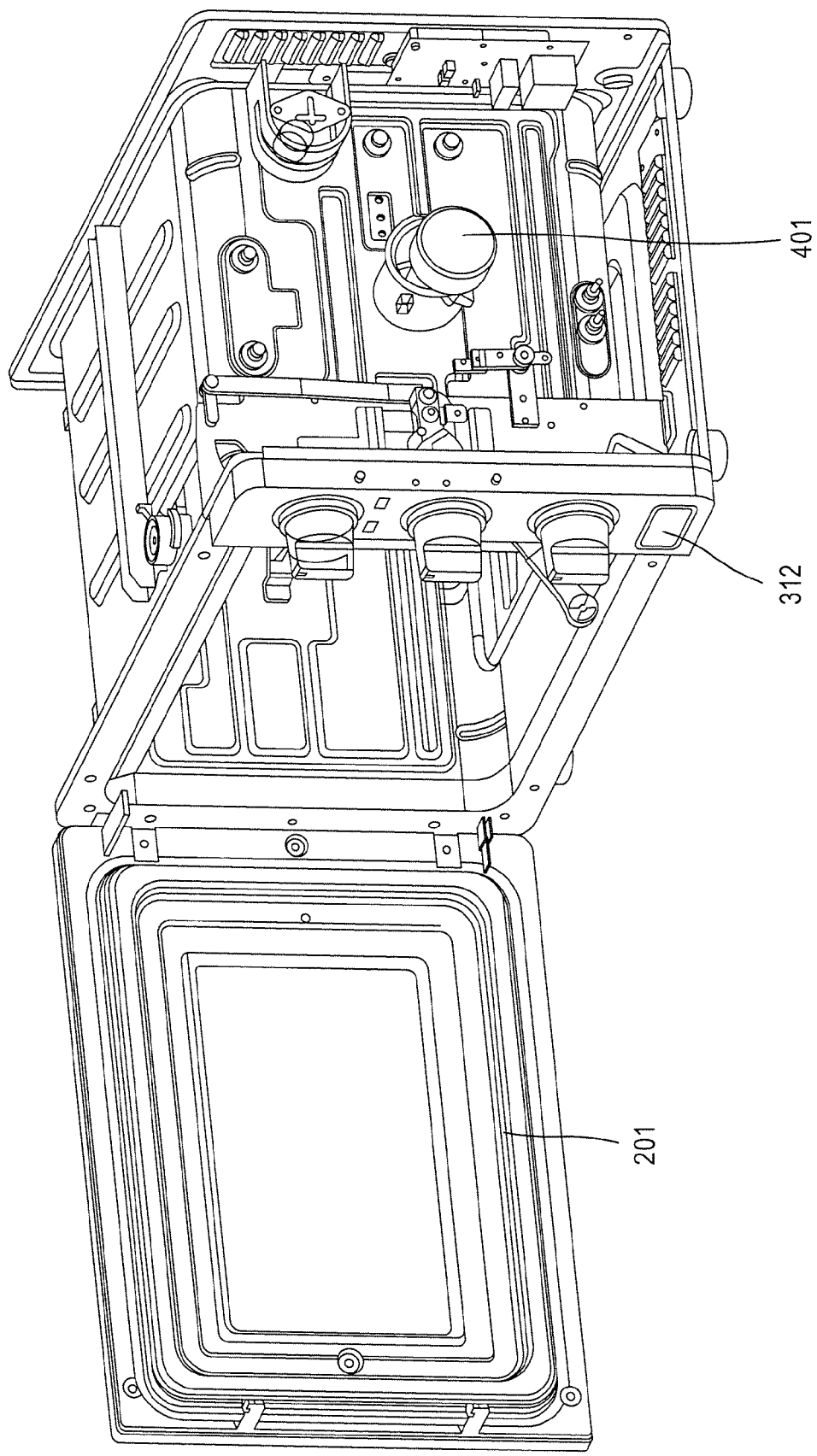
FIG. 2 is a diagram illustrating a pressurized oven according to various aspects of the invention.
Figure 3:
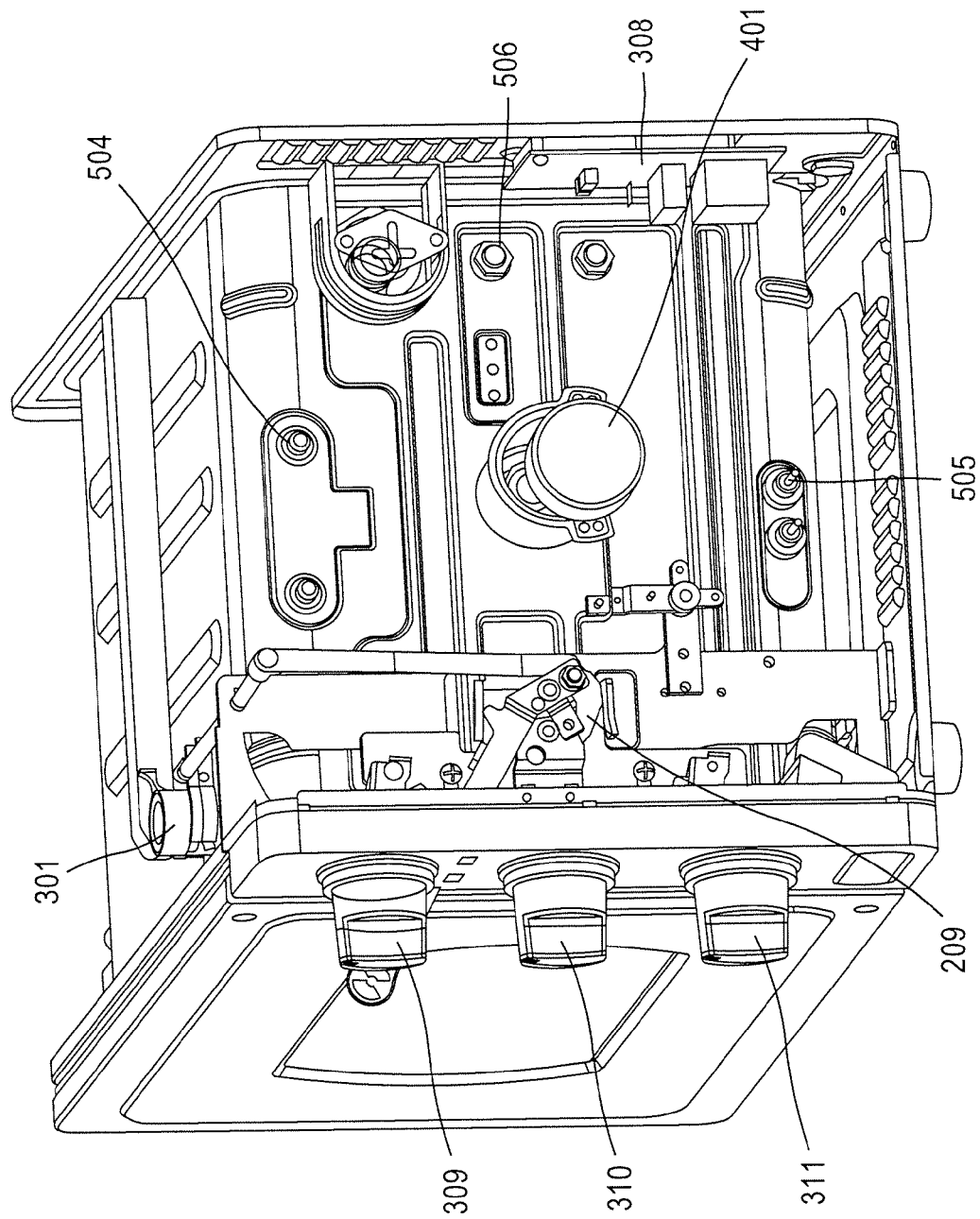
FIG. 3 is a diagram illustrating a pressurized oven according to various aspects of the invention.

Referring to FIG. 1 to FIG. 3, aspects of the present invention include an oven 100 having a cavity 101, a door assembly 200, a heater and a control system, wherein the door assembly 200, heater and control system are attached to the cavity 101. The oven cavity may be used to accommodate food preparation, the heater to heat the cavity and cook food, and the control system to control the operation of the oven.

Figure 4:
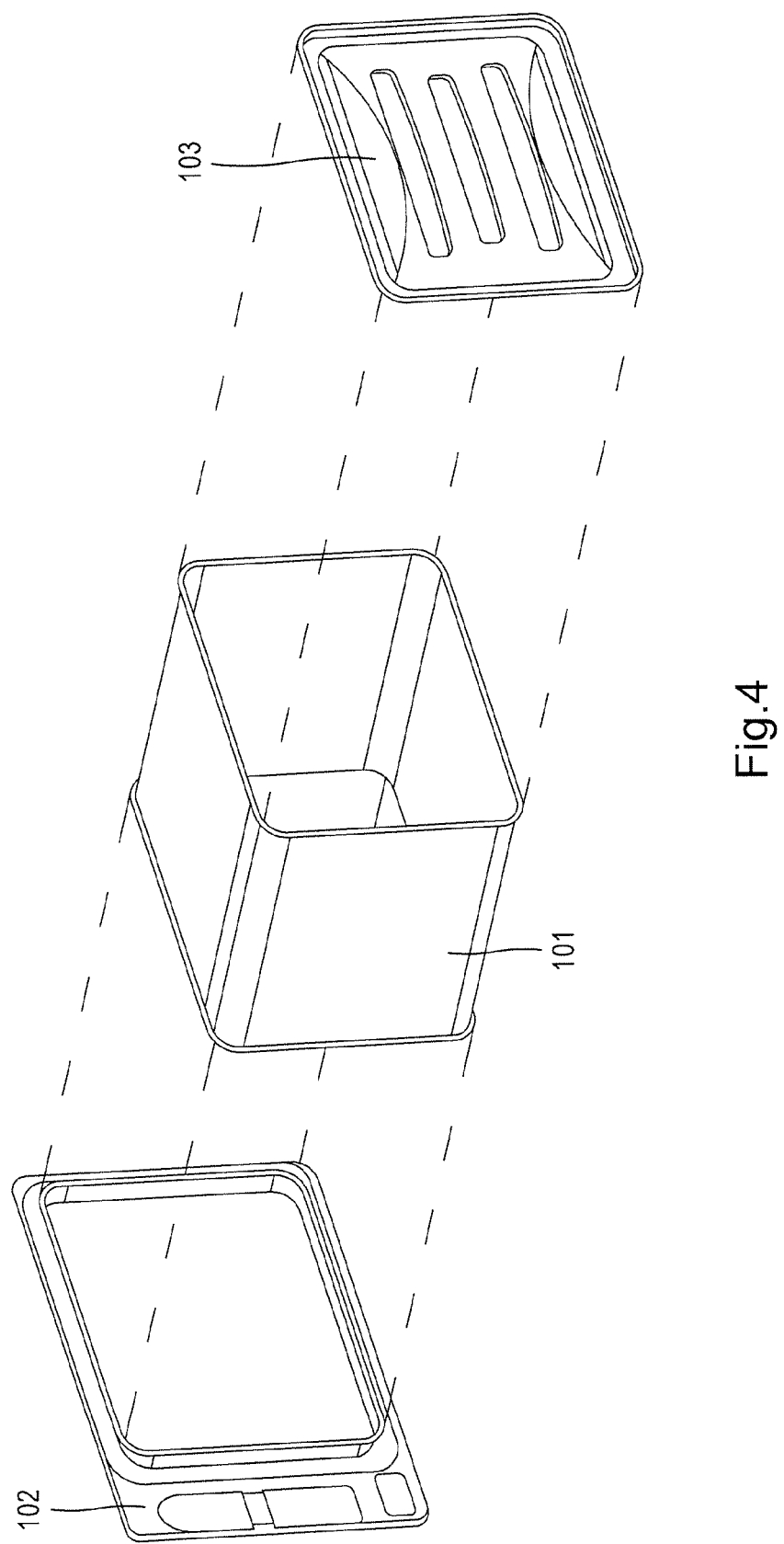
FIG. 4 is an exploded view of a cavity component of a pressurized oven according to various aspects of the invention.
Figure 5:
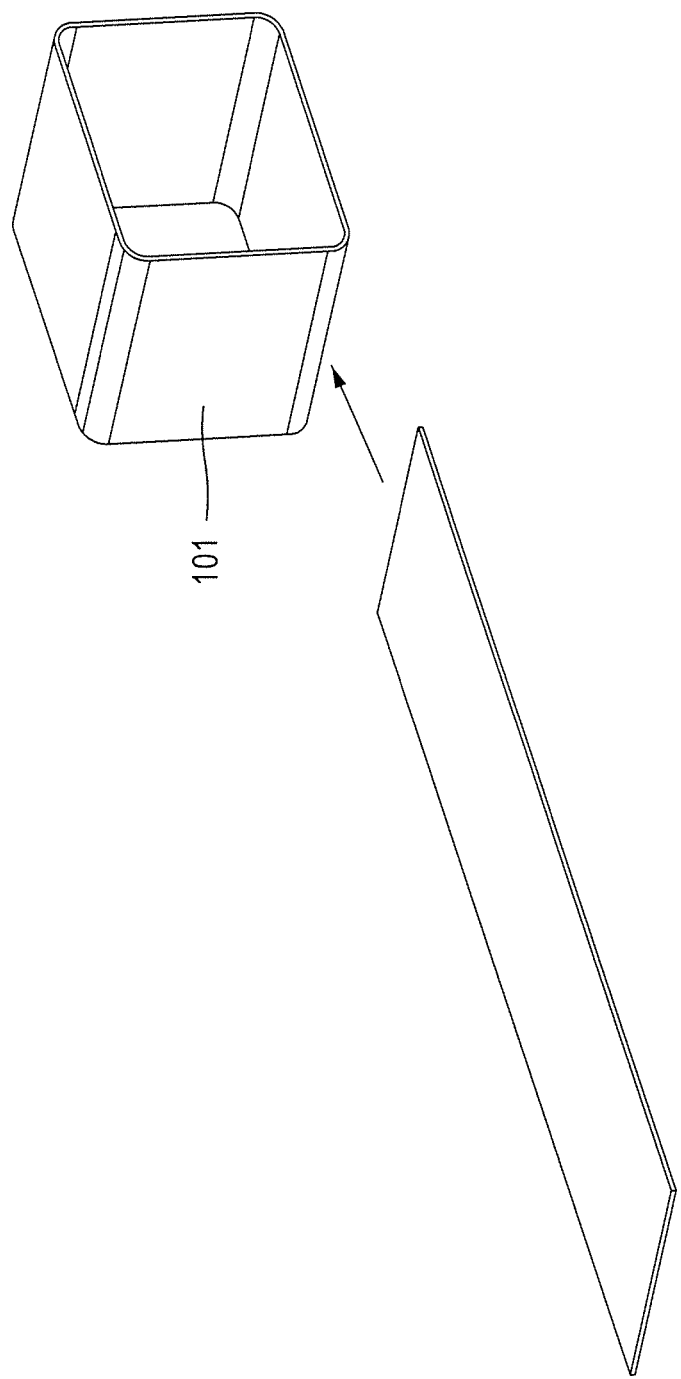
FIG. 5 illustrates a process of cavity manufacturing according to various aspects of the invention.

Referring to FIG. 4 and FIG. 5, the cavity component may include cavity walls 101, front frame 102 and rear plate 103. The cavity walls 101 may be formed in a ring structure from a flat plate (such as a steel plate) by stamping and welding in the top, down, left and right directions, welded the with front frame 102 and the rear plate 103 to form a sealed chamber for disposing food products to be cooked. In this embodiment, the cavity walls 101 and front frame 102 and rear plate 103 may be formed in one part with good sealing performance.

Figure 6:
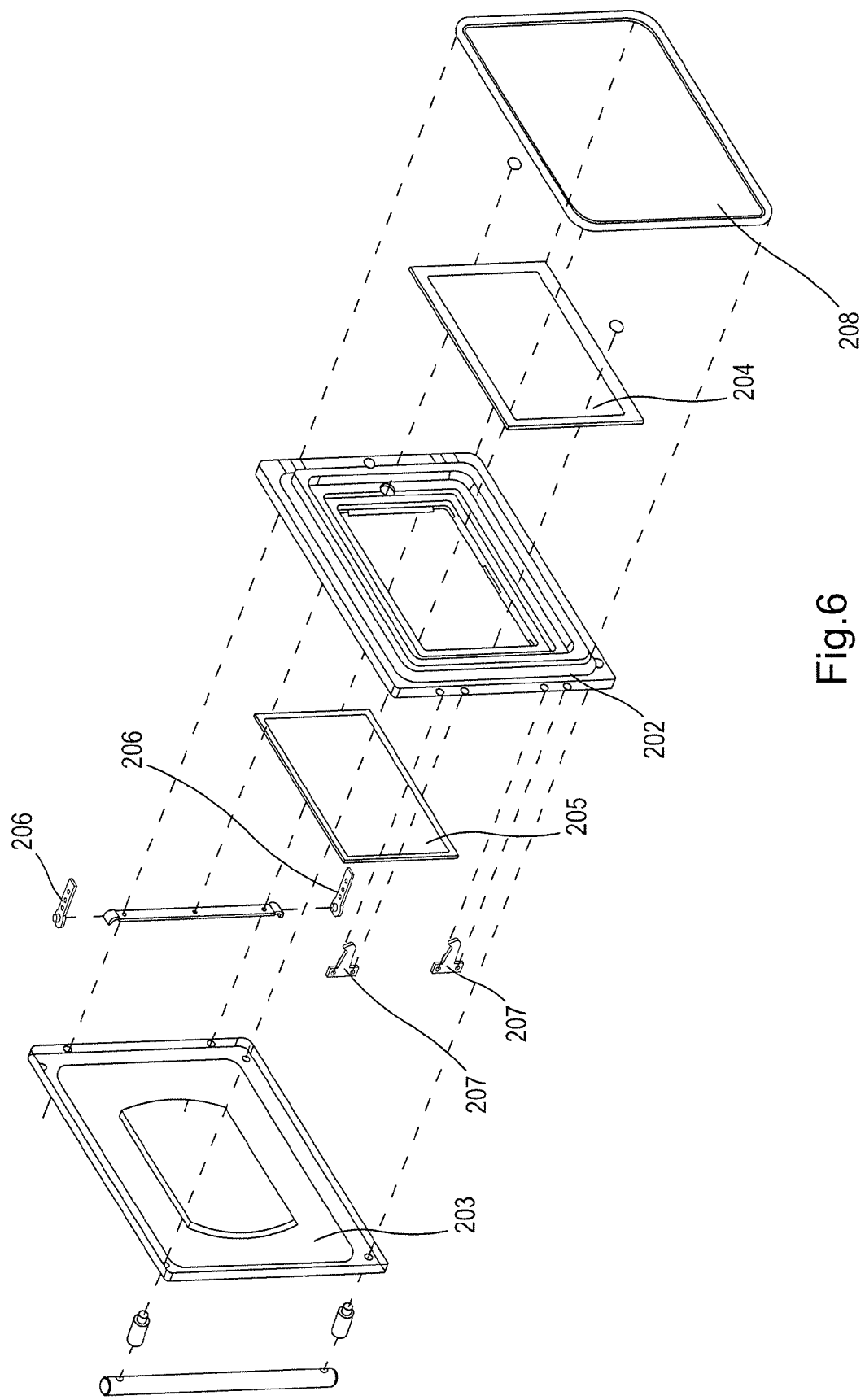
FIG. 6 is an exploded view of a door frame of a pressurized oven according to various aspects of the invention.
Figure 7:
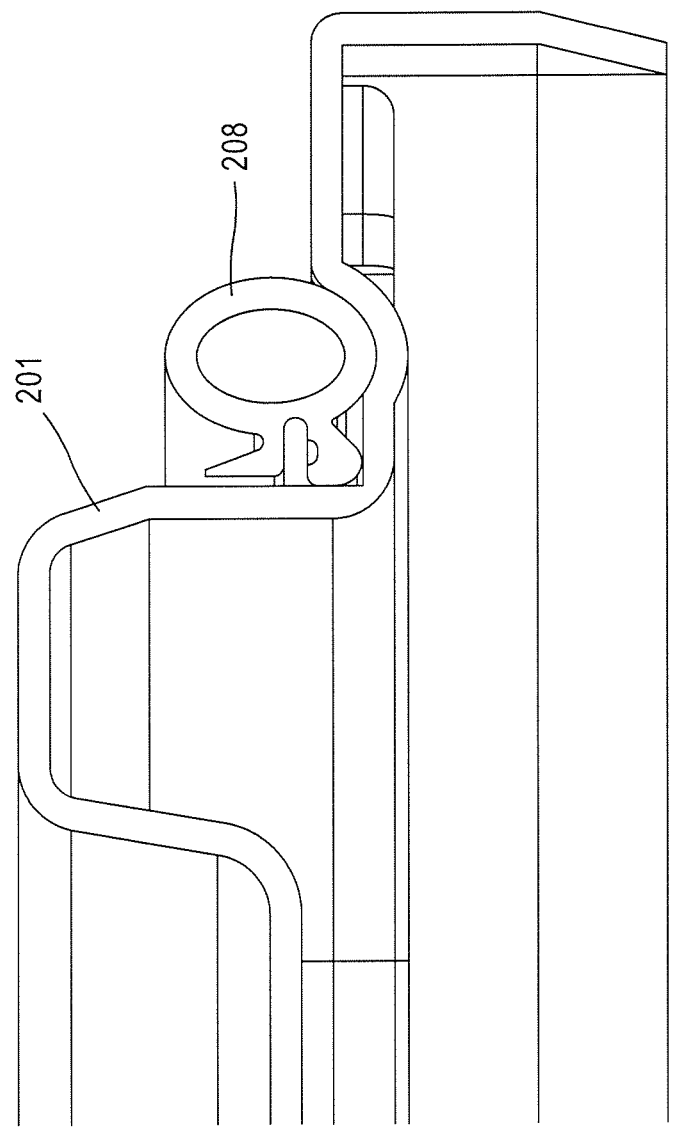
FIG. 7 illustrates a sealing gasket on a door frame of a pressurized oven according to various aspects of the invention.

Referring to FIG. 2, FIG. 6 and FIG. 7, the door assembly may include frame 201, the frame 201 including inner frame 202 and outer frame 203, the inner glass 204 and outer glass 205 being mounted to the inner frame 202 and the outer frame 203, respectively, to obtain a good sealing effect. The frame 201 may include connection part 206, latch 207 and a first sealing gasket 208. One side of frame 201 may connect to connection part 206 on the front frame to allow rotation, another side of frame 201 may be engaged through latch 207 to open and close the door. When the door is closed, the first sealing gasket 208 may seal the frame 201 and the front frame.

Figure 8:
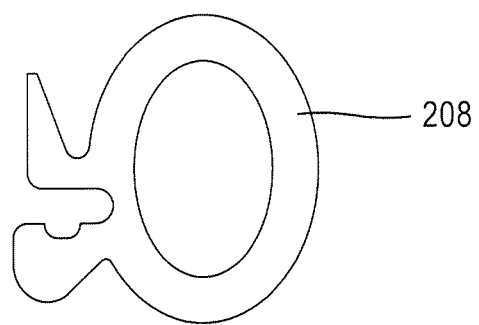
FIG. 8 is a view of a sealing gasket according to various aspects of the invention.

Referring to FIG. 8, which may be different from an electrical pressure cooker, the temperature at the center of the oven may reach 230° C., so the first sealing gasket 208 must be specially designed to have a stable elasticity at high temperatures and seal the oven for long durations of use. According to various aspects, the first sealing gasket may include a round-shape silicon tube with a diameter of about 8 mm, with good elasticity and sealing performance for long durations of use at high temperatures. To fit with front frame tightly, the first sealing gasket 208 may have two protrusions to ensure that the door frame is tightly sealed with the front frame.

Figure 9:
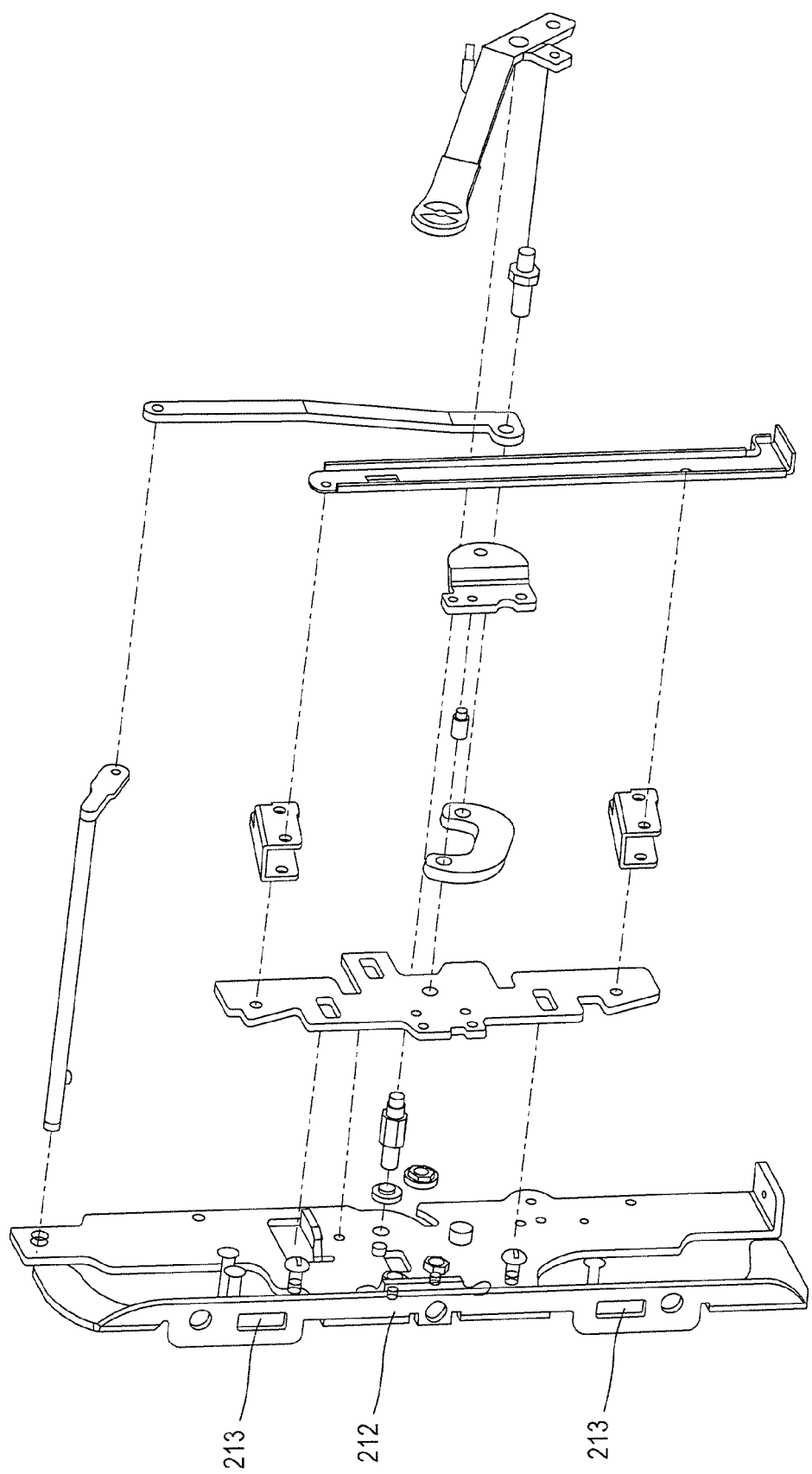
FIG. 9 is an exploded view of a locking mechanism of a pressurized oven according to various aspects of the invention.
Figure 10:
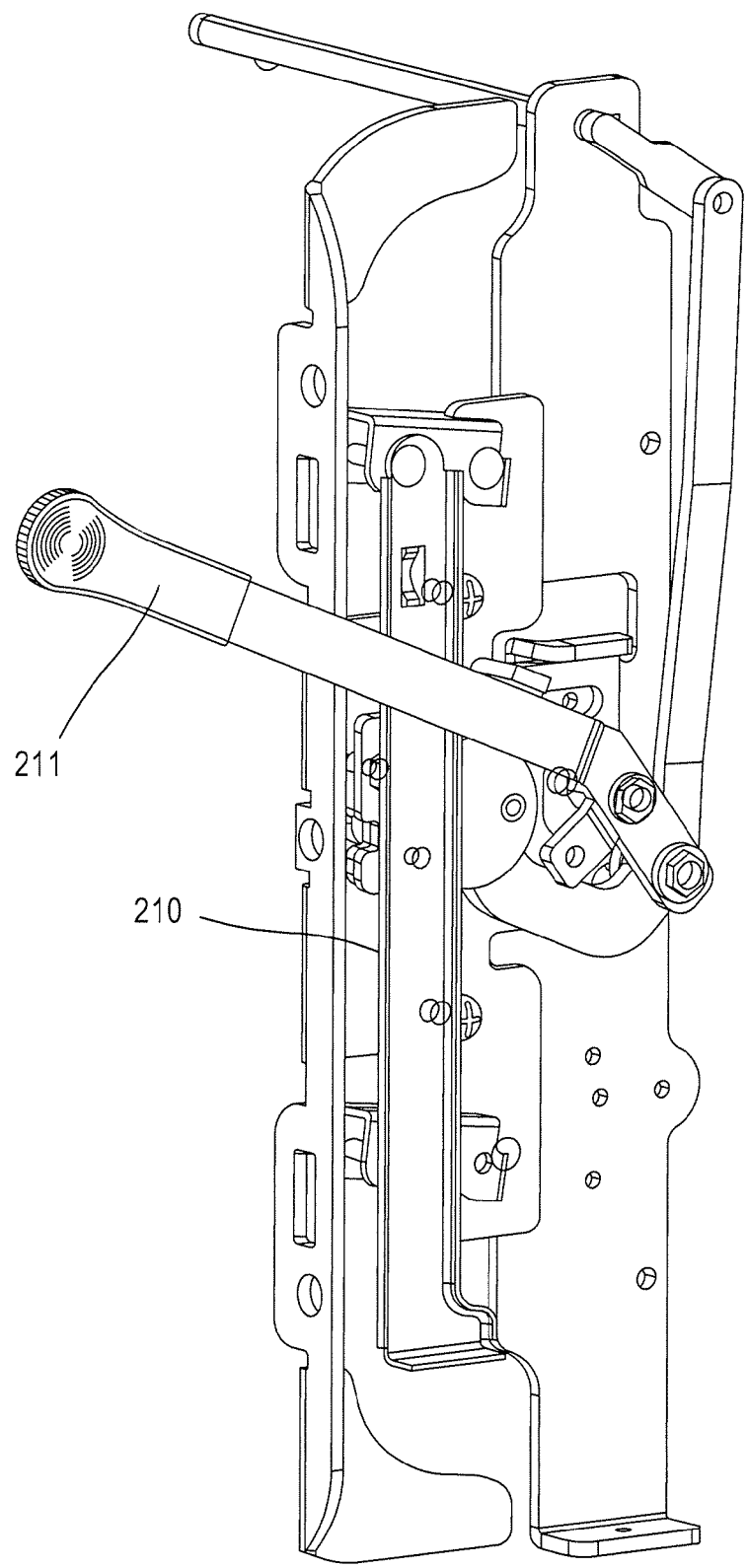
FIG. 10 illustrates the unlock status of the locking mechanism of a pressurized oven according to various aspects of the invention.
Figure 11:
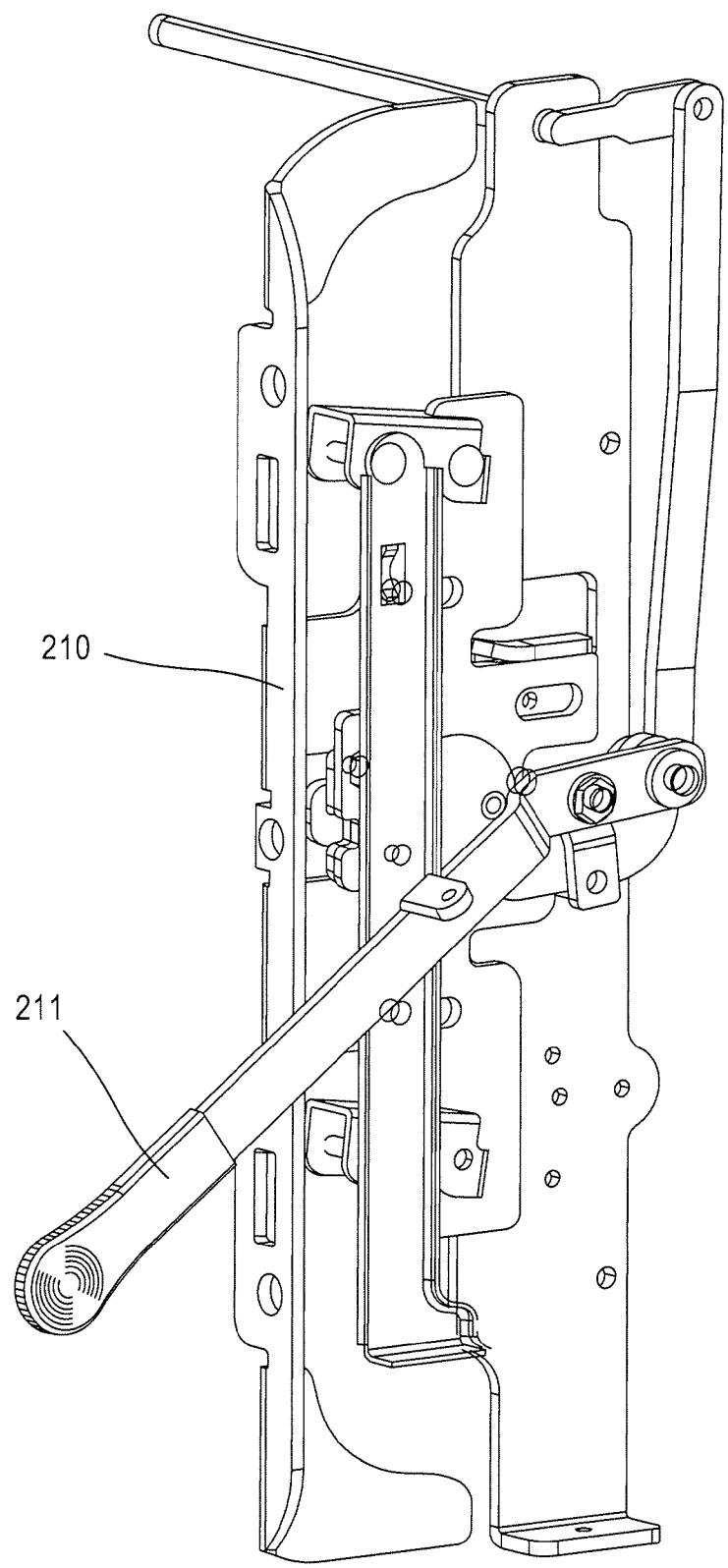
FIG. 11 illustrates the lock status of the locking mechanism of a pressurized oven according to various aspects of the invention.

Referring to FIG. 3, FIG. 9 and FIG. 11, the door assembly may include locking mechanism 209 on the front plate, the locking mechanism 209 may include transmission parts 210 and lever 211, transmission parts 210 and lever 211 being assembled together to form a linkage mechanism. The transmission parts 210 may include a plurality of metal parts 212, one of the metal parts 212 having a slot 213 to fit with a door latch and to connect the latch when the door is closed.

The locking mechanism may be designed by a lever principle, where when the lever 211 may move up and/or down, the transmission parts 210 may move forward and/or backward to drive the door frame fittingly with the front frame, and presses the first sealing gasket to seal the frame and front frame.

Figure 12:
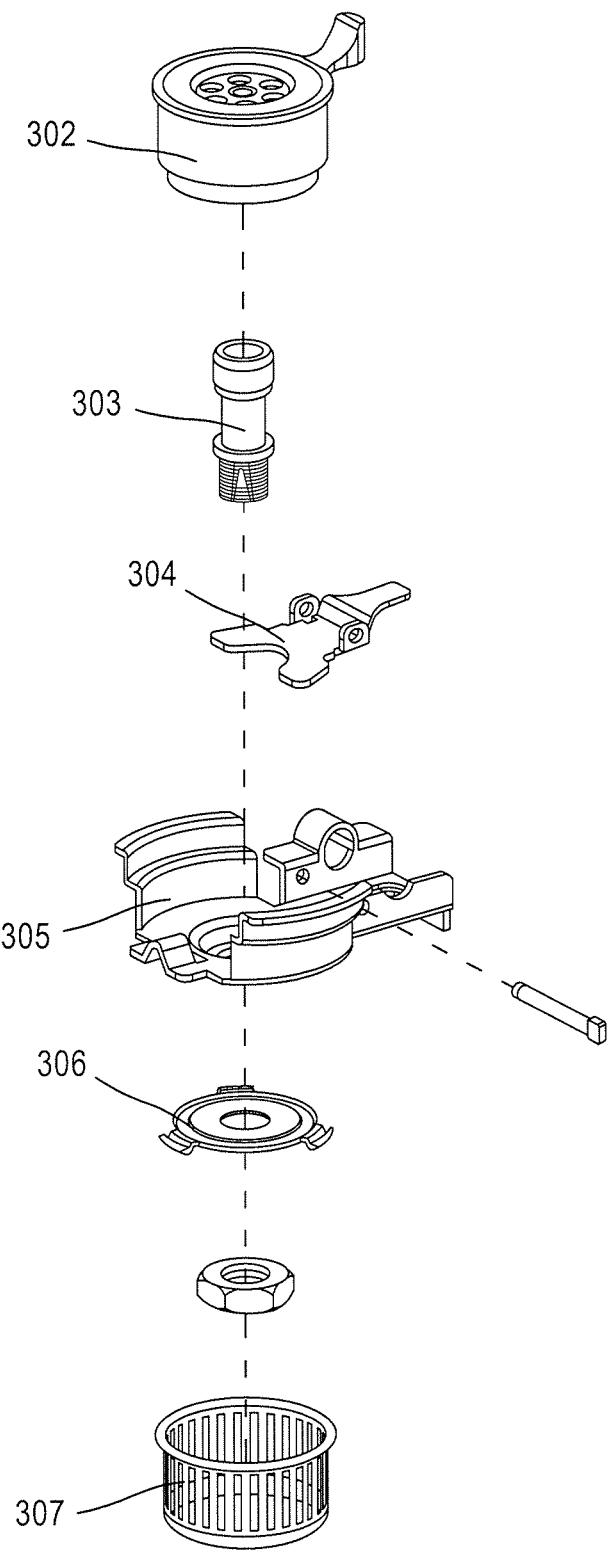
FIG. 12 is an exploded view of a relief valve of a pressurized oven according to various aspects of the invention.
Figure 13:
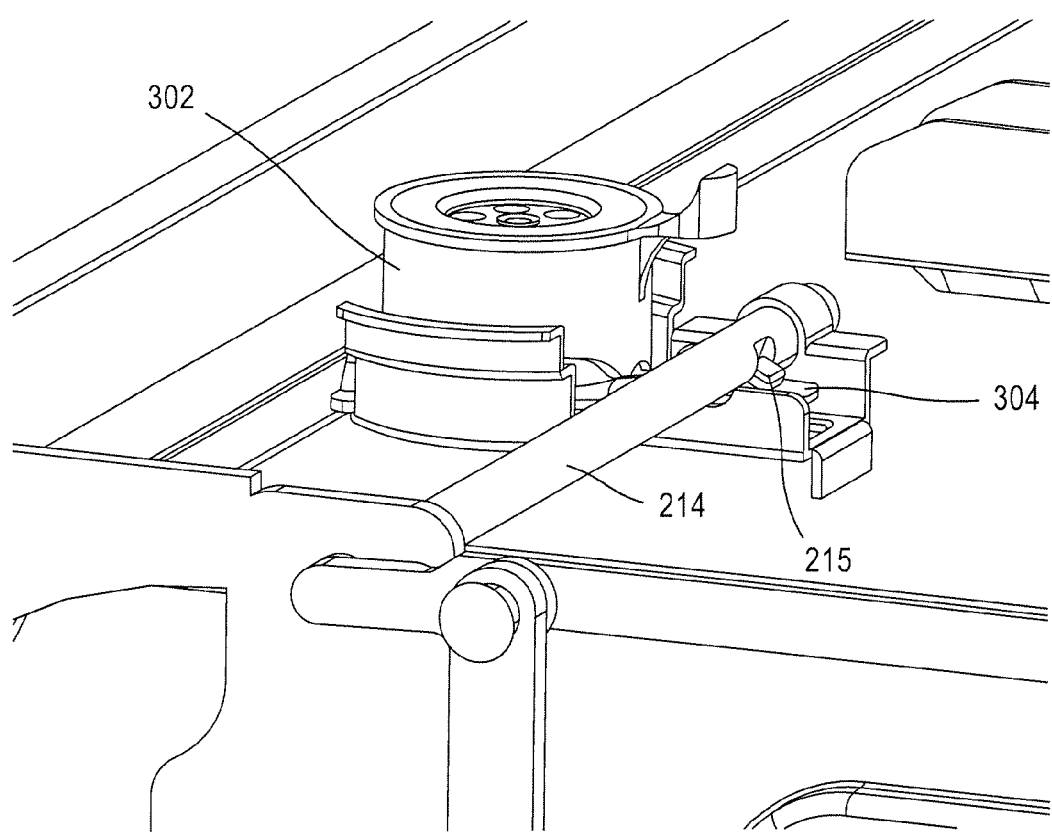
FIG. 13 illustrates the working status of the relief valve and the locking mechanism during cooking, according to various aspects of the invention.
Figure 14:
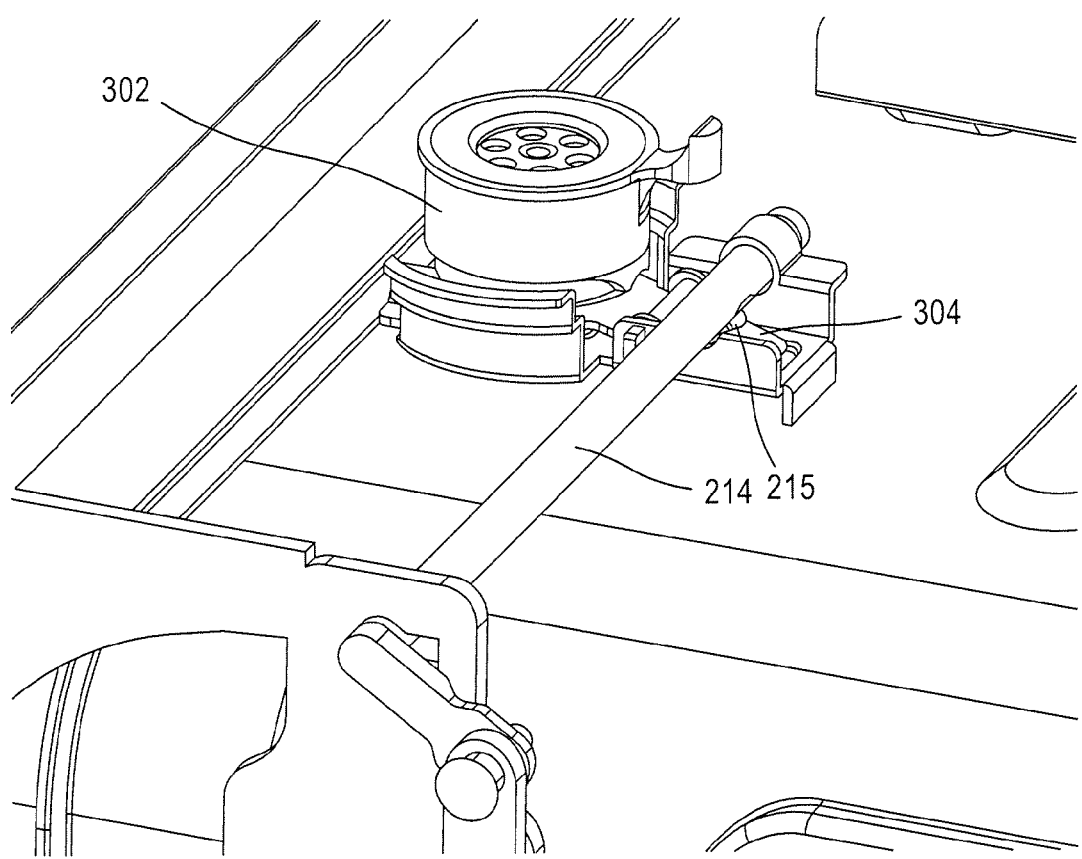
FIG. 14 illustrates the status of the relief valve and the locking mechanism after cooking is complete, according to various aspects of the invention.

Referring to FIG. 3, FIG. 12 and FIG. 14, the control system may include a relief valve 301 on top of the cavity, the relief valve 301 consisting of a valve weight with handle 302, a venting stub 303, a valve rock plate 304, a bracket 305, a silicon sealing gasket 306 and a filter cover 307, wherein the valve weight sits on the top of venting stub 303, the relief valve 301 connects to the cavity with the silicon gasket 306 for sealing. The pressure of the cavity gas may thus be increased gradually with cooking time in order to prevent accidental explosions due to the high pressure. The relief valve 301 may be used to exhaust and relief pressure. In the process of the present oven cooking, the high pressure of gas and steam inside of the food product being expanded by heat may be released from the venting stub 303. Because the valve weight 302 is located on top of venting stub 303, when the pressure inside the cavity is lower than the weight of the valve weight 302, the gas is not released and the oven is in sealed status. On the other hand, when the pressure inside the oven cavity is higher than the weight of valve weight block 302, the valve weight block may be lifted and the gas is released to relieve the pressure. Once the pressure is once again lower than the weight of the valve weight block 302, the oven is back to being sealed.

According to various aspects, an inner hole diameter of the venting stub 303 may be 5 to 8 mm (such as 6 mm), the weight of the valve weight block may be 22 to 24 g, which may maintain the pressure inside of the oven cavity to about 6.8 to 10 KPa. After cooking is complete, moving the handle of valve weight block 302 may lift the valve weight block 302 to completely release the gas and relieve the pressure.

According to various aspects, in order to ensure safety of the oven and any over users, the locking mechanism 209 may be designed to move with the relief valve by a linkage. One metal part 214 of transmission parts may have a protrusion to press the rock plate 215, so that after cooking complete, moving up the lever may lift the valve weight block to relieve pressure through the linkage movement of metal part 214 pressing down on the rock plate 214. Once the pressure is completely released from the oven cavity, the door can be safely opened.

Figure 15:
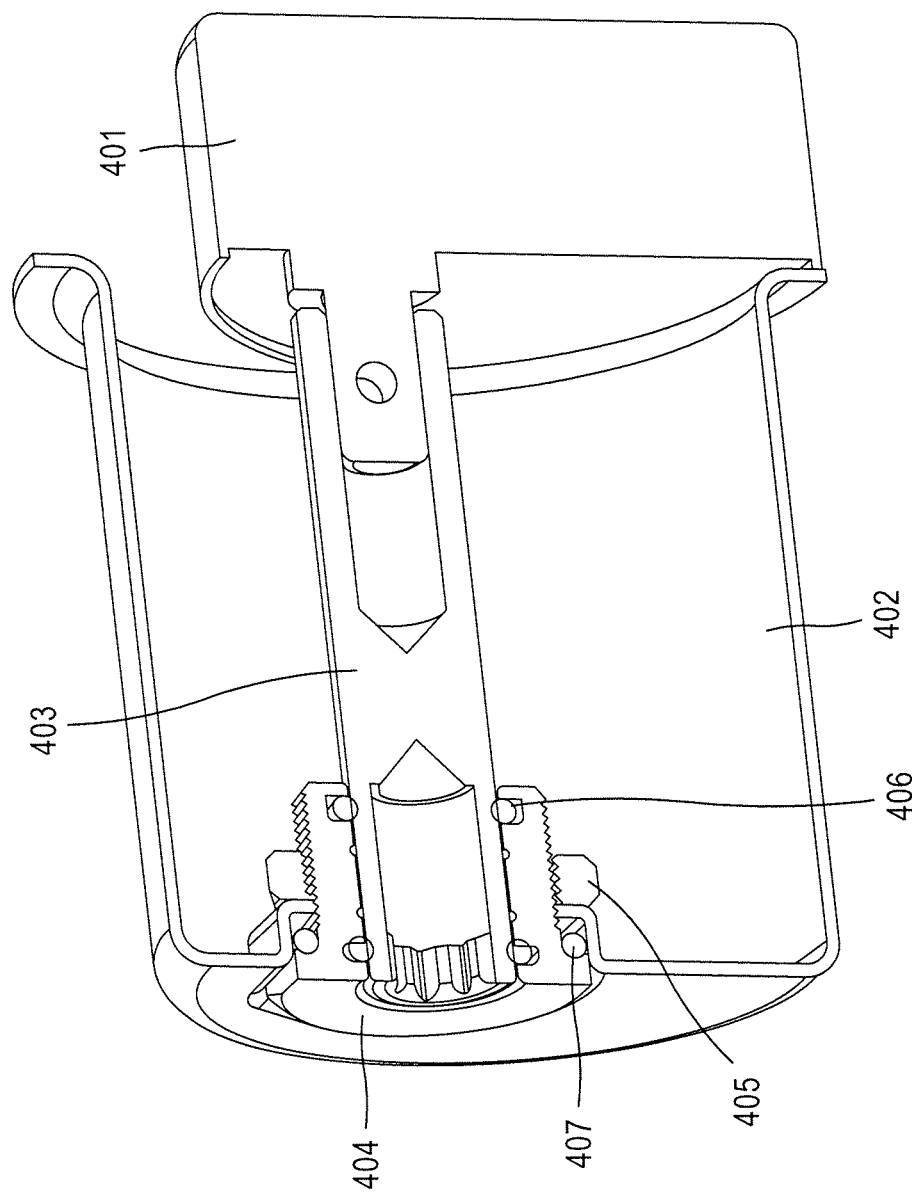
FIG. 15 illustrates an example aspect of a rotisserie assembly according the present invention.

Referring FIG. 2, FIG. 3 and FIG. 15, aspects of the present invention may include a rotisserie assembly, the rotisserie assembly including motor 401, bracket 402, connection shaft 403, rod and forks (not showed), sleeve 404 and nut 405. The motor may be mounted on the bracket 402 and attached on the cavity. One side of connection shaft 403 may connect with motor 401, another side may connect with the rotisserie rod, and the sleeve 404 accommodating the connection shaft 403 may be mounted on the cavity via nut 405. According to various aspects, the sleeve 404 material may be brass, the second sealing gasket 406 may be located between the enter hole of the sleeve 404 and the connection shaft 403 to ensure sealing of the cavity, and the second sealing gasket material may include high temperature resistant Viton. Also, a third sealing gasket between sleeve 404 and nut 405 may be provided to seal the cavity, the material of the third sealing gasket may also include high temperature resistant Viton. When cooking a food product, a user may place the food product on the rotisserie, and the speed of rotisserie is about 2 to about 3 rpm to obtain an even and high quality cooking performance.

Figure 16:
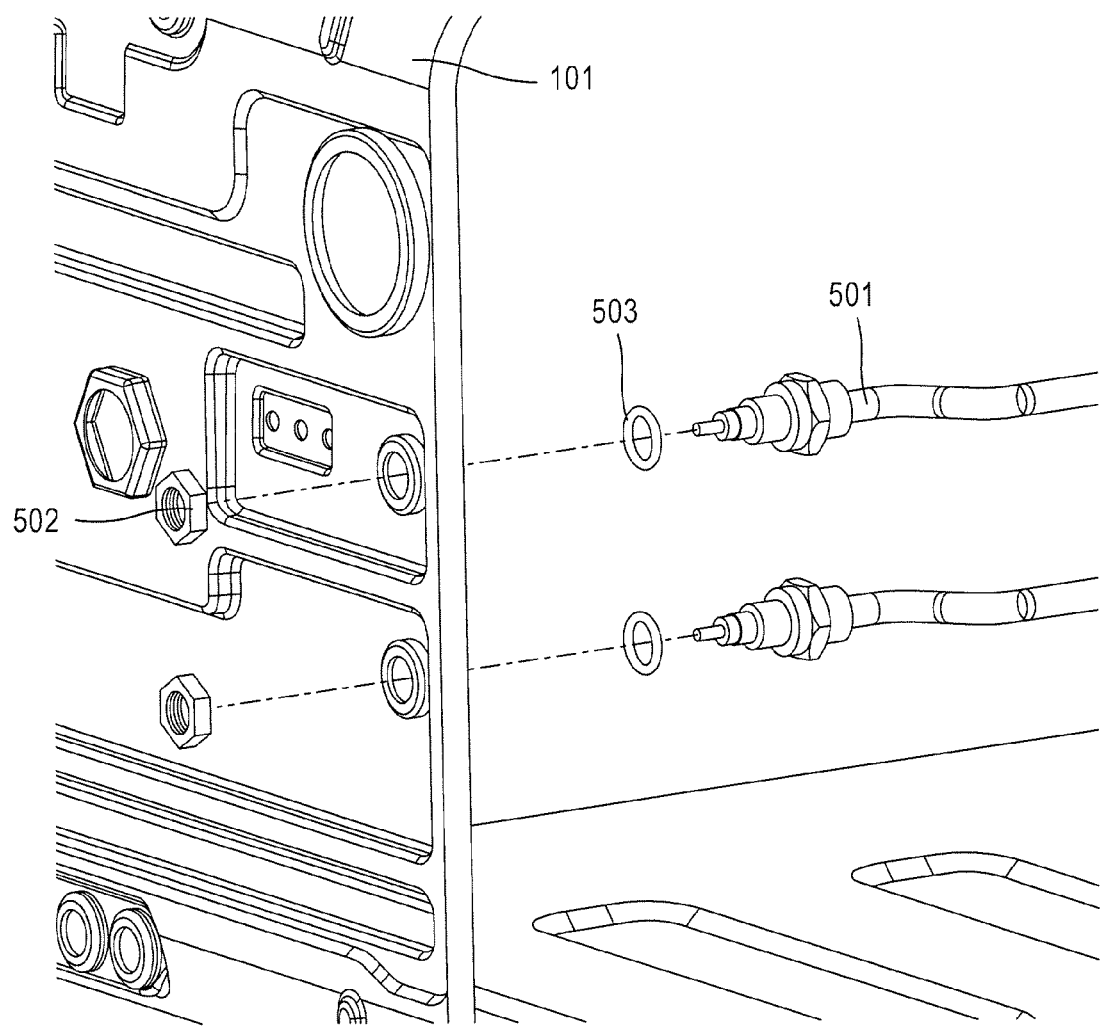
FIG. 16 illustrates a heating element assembly according to various aspects of the invention.

Referring to FIG. 2, FIG. 3 and FIG. 16, the heater may include at least one heating element assembly, the element assembly including heating element 501, fastener 502 and sealing gasket 503, the heating element 501 being mounted to the cavity 101 via fastener 502 and sealed by the sealing gasket 503. According to various aspects, the fastener 502 may include a hexagonal nut, the sealing gasket may be a Viton O-ring, a temperature-resistant silicon glue may be applied between fastener 502 and heating element 501 in order to seal the chamber. According to various aspects, the heater may include a plurality of heating elements, such as top heating element 504, bottom heating element 505 and rear heating element 506 which, in case of need, may help further increase the cooking temperature and greatly shorten the cooking time. According to various aspects, there may be more or less than three heating elements depending on the particular cooking desired.

Referring to FIG. 1 to FIG. 3, the control system may include temperature controller 308, temperature selection switch 309, function switch 310, timer 311 and door release button 312, wherein the temperature selection switch 309, function switch 310, timer 311 and door release button 312 may be located on the front control panel and the temperature controller 308 on the rear plate. The temperature controller 308 and selection switch 309 may be used to control the cooking temperature of the oven cavity, where the power may be turned off when the temperature is too high, and turned on when the temperature is lower than a desired setting. According to various aspects, the function switch 310 may control the combination of the various heating elements, such as top heating element, bottom heating element, top heating element plus bottom heating element, and top heating element plus rear heating element among other combinations. The timer 311 may be used to control the cooking time, where the over may be turned off when a desired time has elapsed. The door release button 312 may be used to release the door after cooking and completely exhaust the pressure inside the oven cavity.

According to various aspects, the process of food preparation may include the following steps: 1. Check unit parts and circuits; 2. Dispose food products on bake pan and place bake pan in cavity; 3. Close the door and pull down the lever to seal the cavity; 4. Set the temperature via the temperature selection switch based on personal preference and food product; 5. Select the heating style via a function switch based on personal preference and food product (at least four kinds of heating element combinations are provided in aspects of the current invention); 6. Set the cooking time by turning timer knob; 7. During cooking, the relief valve may seal the cavity if the pressure is less than about 6.8 to about 10 KPa, and the steam and gas may be released from the relief valve if the pressure is over about 6.8 to about 10 KPa; 8. Cycling on and off during the cooking cycle to maintaining the desired temperature; 9. Turning off the oven when the set time has elapsed; 10. Keep pressure inside of the oven cavity for several minutes, then, move the vent release valve to relief pressure; 11. Wait for the pressure to dissipate, pull the lever up, the locking mechanism will release the door a little; 12. Press down the door release button, open the door and take out the cooked food product.

According to various aspects of the present invention, rapid cooking and energy-saving can be achieved through a full sealed chamber to further reduce the heat loss. Meanwhile, the pressure of gas in the oven may be higher than atmospheric pressure due to expansion when heated, and the boiling point temperature of food insider water in the oven may be thereby increased, so that the cooking temperature inside the oven cavity may be raised accordingly, and the cooking time may be greatly reduced. The oven according to aspects of the present invention may save 40 to 50% energy compared to traditional oven.

According to various aspects, the oven may not include the rotisserie assembly, and may only include cavity component, door assembly, heater and control system, which simplifies the construction of the oven.

Figure 17:
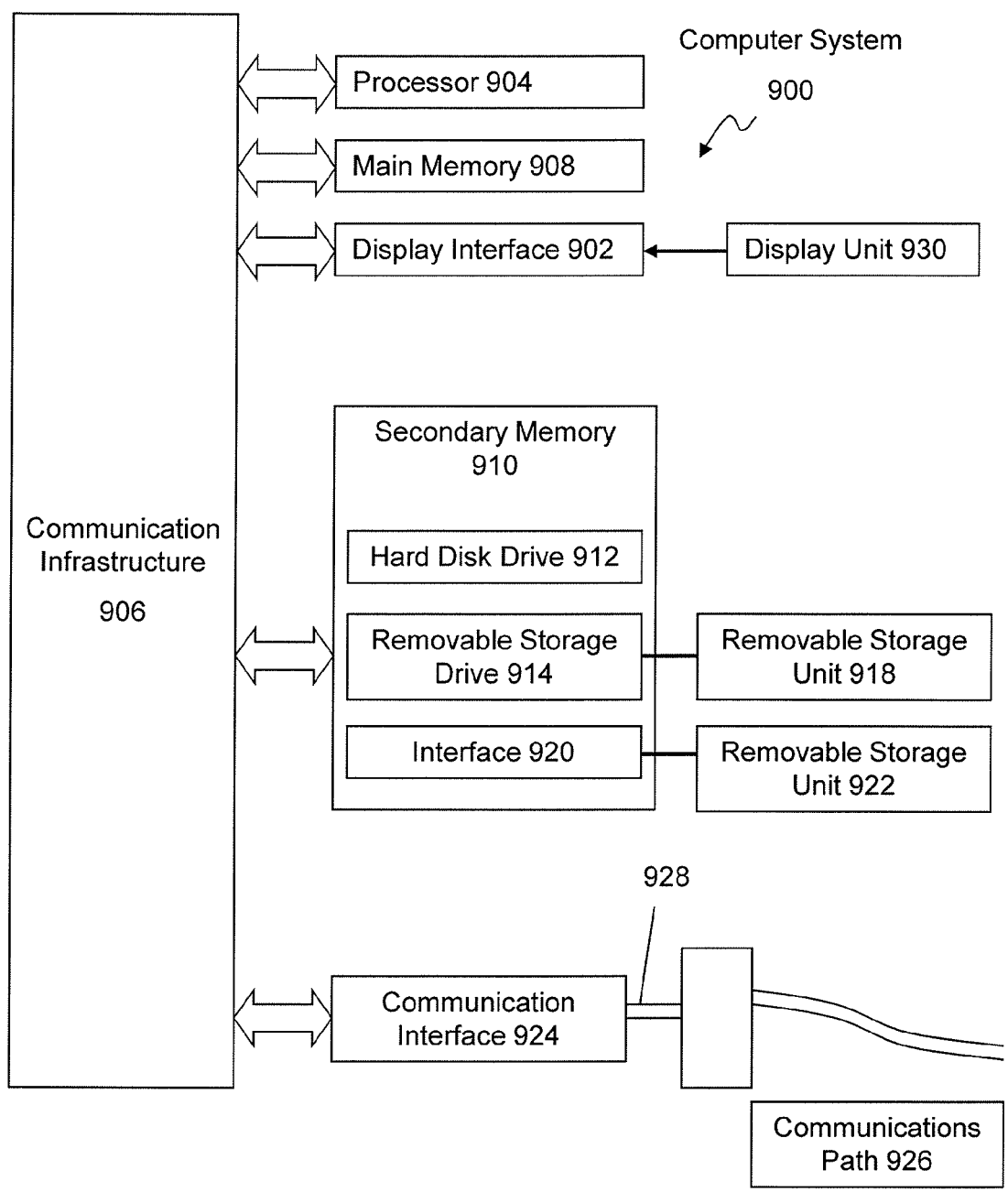
FIG. 17 presents an example system diagram of various hardware components and other features, for use in accordance with an aspect of the present invention.

According to various aspects, the pressurized oven may be controlled via various hardware components. FIG. 17 presents an example system diagram of various hardware components and other features, for use in accordance with an aspect of the present invention. Aspects of the present invention may be implemented using hardware, software, or a combination thereof and may be implemented in one or more computer systems or other processing systems. In one exemplary variation, aspects of the invention are directed toward one or more computer systems capable of carrying out the functionality described herein. An example of such a computer system 900 is shown in FIG. 17.

Computer system 900 includes one or more processors, such as processor 904. The processor 904 is connected to a communication infrastructure 906 (e.g., a communications bus, cross-over bar, or network). Various software aspects are described in terms of this example computer system. After reading this description, it will become apparent to a person skilled in the relevant art(s) how to implement aspects of the invention using other computer systems and/or architectures.

Computer system 900 may include a display interface 902 that forwards graphics, text, and other data from the communication infrastructure 906 (or from a frame buffer not shown) for display on a display unit 930. Computer system 900 also includes a main memory 908, preferably random access memory (RAM), and may also include a secondary memory 910. The secondary memory 910 may include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918, represents a floppy disk, magnetic tape, optical disk, etc., which is read by and written to removable storage drive 914. As will be appreciated, the removable storage unit 918 includes a computer usable storage medium having stored therein computer software and/or data.

In alternative aspects, secondary memory 910 may include other similar devices for allowing computer programs or other instructions to be loaded into computer system 900. Such devices may include, for example, a removable storage unit 922 and an interface 920. Examples of such may include a program cartridge and cartridge interface (such as that found in video game devices), a removable memory chip (such as an erasable programmable read only memory (EPROM), or programmable read only memory (PROM)) and associated socket, and other removable storage units 922 and interfaces 920, which allow software and data to be transferred from the removable storage unit 922 to computer system 900.

Computer system 900 may also include a communications interface 924. Communications interface 924 allows software and data to be transferred between computer system 900 and external devices. Examples of communications interface 924 may include a modem, a network interface (such as an Ethernet card), a communications port, a Personal Computer Memory Card International Association (PCMCIA) slot and card, etc. Software and data transferred via communications interface 924 are in the form of signals 928, which may be electronic, electromagnetic, optical or other signals capable of being received by communications interface 924. These signals 928 are provided to communications interface 924 via a communications path (e.g., channel) 926. This path 926 carries signals 928 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 980, a hard disk installed in hard disk drive 970, and signals 928. These computer program products provide software to the computer system 900. Aspects of the invention are directed to such computer program products.

Computer programs (also referred to as computer control logic) are stored in main memory 908 and/or secondary memory 910. Computer programs may also be received via communications interface 924. Such computer programs, when executed, enable the computer system 900 to perform various features in accordance with aspects of the present invention, as discussed herein. In particular, the computer programs, when executed, enable the processor 910 to perform such features. Accordingly, such computer programs represent controllers of the computer system 900.

In variations where aspects of the invention are implemented using software, the software may be stored in a computer program product and loaded into computer system 900 using removable storage drive 914, hard drive 912, or communications interface 920. The control logic (software), when executed by the processor 904, causes the processor 904 to perform the functions in accordance with aspects of the invention as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

While aspects of this invention have been described in conjunction with the example features outlined above, various alternatives, modifications, variations, improvements, and/or substantial equivalents, whether known or that are or may be presently unforeseen, may become apparent to those having at least ordinary skill in the art. Accordingly, the example aspects of the invention, as set forth above, are intended to be illustrative, not limiting. Various changes may be made without departing from the spirit and thereof. Therefore, aspects of the invention are intended to embrace all known or later-developed alternatives, modifications, variations, improvements, and/or substantial equivalents.

What is claimed is:

1. A pressurized oven, comprising:
    a control system;
    a cavity configured to withstand a pressure higher than atmospheric pressure;
    a heater configured to heat an interior of the cavity to a predetermined temperature;
    a locking mechanism configured to hermetically seal the cavity, the locking mechanism comprising a lever; and
    a relief valve configured to release gas from inside the cavity of the pressurized oven when a pressure inside the cavity of the pressurized oven is equal to or above a first given pressure, the relief valve having a linkage coupled to the lever of the locking mechanism; whereby when the lever on locking mechanism is actuated, the relief valve is configured to release gas from inside the cavity.

2. The pressurized oven of claim 1, wherein:
    the relief valve is located on a top portion of the pressurized oven;
    a weight of the relief valve maintains the relief valve closed when the pressure inside the cavity of the pressurized oven is below the first given pressure; and
    the relief valve is configured to open when the pressure inside the cavity of the pressurized oven is equal to at least the first given pressure.

3. The pressurized oven of claim 1, further comprising:
    a pressure sensor configured to sense the pressure inside the cavity of the pressurized oven;
    wherein the heater is turned off when the pressure is equal to at least a second given pressure.

4. The pressurized oven of claim 1, wherein the predetermined temperature is up to about 230° C.

5. The pressurized oven of claim 1, wherein:
    the locking mechanism comprises a transmission part and a lever; and
    when the lever is actuated, the transmission part is moved to hermetically seal a door frame of the cavity by pulling a door of the pressurized oven against the door frame, the door being sealed via a first sealing gasket disposed between the door and the door frame.

6. The pressurized oven of claim 1, wherein the relief valve is positioned on a venting stub and is coupled to the cavity of the pressurized oven via a second sealing gasket.

7. The pressurized oven of claim 2, wherein gas inside the cavity of the pressurized oven is released when the relief valve is open.

8. The pressurized oven of claim 2, wherein the relief valve is configured to gradually release gas as the pressure inside the cavity of the pressurized oven increases.

9. The pressurized oven of claim 8, wherein an accidental explosion of the pressurized oven is prevented by the configuration of the relief valve.

10. The pressurized oven of claim 2, wherein:
    an inside diameter of the venting stub is about 5 mm to about 8 mm; and
    the weight of the relief valve is about 22 g to about 24 g.

11. The pressurized oven of claim 1, wherein:
    a rotisserie may be disposed inside the cavity of the pressurized over;
    the rotisserie may rotate during cooking at a rotation speed of about 2 rpm to about 3 rpm.

12. The pressurized oven of claim 1, wherein the control system comprises:
    a relief valve controller;
    a temperature controller;
    a temperature selection switch;
    a function switch that switches between top heating elements, rear heating elements and bottom heating elements; and a timer.

13. The pressurized oven of claim 1, wherein a top wall, a bottom wall, a rear wall and side walls of the cavity are welded together to form a sealed chamber.

14. The pressurized oven of claim 1, wherein a pressure inside the oven is maintained to between about 6.8 kPa to about 10 kPa.

15. The pressurized oven of claim 12, wherein the relief valve controller is configured to open the relief valve when cooking is complete to decrease the pressure inside the cavity of the pressurized oven.

\* \* \* \* \*